US007594146B2

(12) United States Patent  (10) Patent No.: US 7,594,146 B2
Horikawa et al.  (45) Date of Patent: Sep. 22, 2009

(54) APPARATUS, METHOD, AND PROGRAM FOR CORRECTING TIME OF EVENT TRACE DATA

(75) Inventors: Takashi Horikawa, Tokyo (JP); Toshiaki Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 695 days.

(21) Appl. No.: 11/062,930

(22) Filed: Feb. 23, 2005

(65) Prior Publication Data

US 2005/0193277 A1 Sep. 1, 2005

(30) Foreign Application Priority Data

Feb. 23, 2004 (JP) ............................. 2004-045966

(51) Int. Cl.
*G06F 11/00* (2006.01)
*G07C 3/00* (2006.01)
(52) U.S. Cl. .................... 714/55; 714/45; 714/50; 714/700; 713/400; 713/502; 713/600; 702/89; 702/187; 709/248
(58) Field of Classification Search ................. 714/33, 714/36, 37, 45, 48, 49, 55, 700, 4, 50, 20; 713/375, 502, 503, 500, 400, 600; 702/89, 702/178, 187, 198; 709/248
See application file for complete search history.

(56) References Cited

U.S. PATENT DOCUMENTS

| 5,471,631 | A | * | 11/1995 | Beardsley et al. | ............ | 713/502 |
| 5,774,716 | A | * | 6/1998 | Harbinski et al. | ............ | 707/202 |
| 5,896,524 | A | * | 4/1999 | Halstead et al. | ............. | 713/375 |
| 5,918,040 | A | * | 6/1999 | Jarvis | ........................ | 713/375 |
| 5,964,846 | A | * | 10/1999 | Berry et al. | ................. | 713/375 |
| 6,078,930 | A | * | 6/2000 | Lee et al. | .................... | 707/202 |
| 6,173,418 | B1 | * | 1/2001 | Fujino et al. | .................. | 714/20 |

(Continued)

FOREIGN PATENT DOCUMENTS

JP 62-232055 10/1987

(Continued)

OTHER PUBLICATIONS

3-Tier for Improved Network Performance http://www.scottnichol.com/nettraf.htm version from WayBack Machine archived Jul. 1, 2003.*

*Primary Examiner*—Scott T Baderman
*Assistant Examiner*—Joseph Schell
(74) *Attorney, Agent, or Firm*—Dickstein Shapiro LLP

(57) ABSTRACT

A time correcting apparatus includes a data input section which inputs all event trace data generated for each event executed on computing devices and outputs the event trace data in order of occurrence time of the event data. An inter-machine communication-time-table generating section extracts transmission and reception events from the output event trace data and generates a communication time table indicating communication times between computing devices based on the differences in occurrence time between the corresponding transmission and reception events. A time-offset deriving section generates a time offset table indicating a time offset value for each computing device based on the communication time table. A time correcting section corrects the event occurrence times of all event data based on the time offset table. A data integrating section inputs all event data whose occurrence times have been corrected and outputs the event data in order of corrected occurrence time.

14 Claims, 12 Drawing Sheets

U.S. PATENT DOCUMENTS

| | | | |
|---|---|---|---|
| 6,199,169 B1* | 3/2001 | Voth | 713/400 |
| 6,993,695 B2* | 1/2006 | Rivoir | 714/734 |
| 7,058,837 B2* | 6/2006 | Elko et al. | 713/375 |
| 7,069,176 B2* | 6/2006 | Swaine et al. | 702/176 |
| 7,072,912 B1* | 7/2006 | Verma et al. | 707/202 |
| 7,340,630 B2* | 3/2008 | Morris et al. | 713/400 |
| 7,411,970 B2* | 8/2008 | Scott et al. | 370/419 |
| 7,500,152 B2* | 3/2009 | Moyer et al. | 714/45 |
| 2002/0131398 A1* | 9/2002 | Taylor | 370/350 |
| 2002/0174109 A1* | 11/2002 | Chandy et al. | 707/3 |
| 2003/0177154 A1* | 9/2003 | Vrancic | 708/160 |
| 2005/0060619 A1* | 3/2005 | Liberty et al. | 714/55 |
| 2005/0132246 A1* | 6/2005 | Schmalz et al. | 713/502 |
| 2005/0138383 A1* | 6/2005 | Vainstein | 713/178 |
| 2005/0141566 A1* | 6/2005 | Krzyzanowski | 370/503 |
| 2006/0211434 A1* | 9/2006 | Islam et al. | 455/466 |

FOREIGN PATENT DOCUMENTS

| | | |
|---|---|---|
| JP | 2000-010815 | 1/2000 |
| JP | 2000-348007 | 12/2000 |
| JP | 2003-157185 | 5/2003 |
| JP | 2004-005198 | 1/2004 |

* cited by examiner

| OWN MACHINE NUMBER | TIME | EVENT TYPE | ADDITIONAL INFORMATION | | | |
|---|---|---|---|---|---|---|
| | | | OWN IP ADDRESS | OWN PORT NUMBER | MATING IP ADDRESS | MATING PORT NUMBER |
| 1 | 124567 | TCP_SEND | OWN IP ADDRESS | OWN PORT NUMBER | MATING IP ADDRESS | MATING PORT NUMBER |
| 2 | 124678 | TCP_RECEIVE | OWN IP ADDRESS | OWN PORT NUMBER | MATING IP ADDRESS | MATING PORT NUMBER |
| ... | ... | ... | OWN IP ADDRESS | OWN PORT NUMBER | MATING IP ADDRESS | MATING PORT NUMBER |
| n | 124789 | ... | OWN IP ADDRESS | OWN PORT NUMBER | MATING IP ADDRESS | MATING PORT NUMBER |

FIG. 2

| | 301 | 302 |
|---|---|---|
| | MATING MACHINE NUMBER | MATING IP ADDRESS |
| | 1 | 12.341.56.718 12345789 |
| | 2 | 12.34.56.89 |
| | ... | |
| | n | 12.34.56.91 |

FIG. 3

| | OWN IP ADDRESS | OWN PORT NUMBER | MATING IP ADDRESS | MATING PORT NUMBER | DATA SIZE | TIME |
|---|---|---|---|---|---|---|
| | 401 | 402 | 403 | 404 | 405 | 406 | 407 |
| COMMUNICATION PATH 1 | 12.34.56.78 | 9876 | 98.76.57.32 | 1231 | 21 | 3519 |
| COMMUNICATION PATH 2 | | | | | | |
| ... | | | | | | |
| COMMUNICATION PATH n | | | | | | |

FIG. 4

| | 1 | 2 | ... | n |
|---|---|---|---|---|
| 1 | | 0.15 | | ∞ |
| 2 | -0.10 | | -0.20 | ∞ |
| ... | | 0.30 | | |
| n | ∞ | | | |

502 ← RECEIVER MACHINE NUMBER

501 ↑ TRANSMITTER MACHINE NUMBER

FIG. 5

| 601 | 602 |
|---|---|
| MACHINE NUMBER | TIME OFFSET VALUE |
| 1 | -0.05 |
| 2 | -0.20 |
| ... | ... |
| n | 0.00 |

APPARATUS, METHOD, AND PROGRAM FOR CORRECTING TIME OF EVENT TRACE DATA

This application claims priority to prior application JP 2004-45966, the disclosure of which is incorporated herein by reference.

BACKGROUND OF THE INVENTION

The present invention relates to time correcting apparatuses for correcting time lags of event trace data having event occurrence times acquired from a plurality of computing devices. In particular, the present invention relates to a time correcting apparatus for correcting a relative time lag of event trace data generated across a plurality of computing devices by calculating the difference as a time-offset value between the times of internal clocks in the computing devices based on the event data about communication between the computing devices and by adding the time-offset value to the time included in the acquired event trace data.

In general, event trace data is acquired for analysis when the performance of computing devices, such as computers, is to be measured or transaction profiles are to be generated. More specifically, each time an event (e.g., startup of a program or occurrence of an interrupt) is processed or executed on a computing device, event trace data indicating information such as the type of the event, the status of the computing device, and the event occurrence time is generated. The generated event trace data is acquired and analyzed to, for example, measure the performance of the computing device, generate a transaction profile, or debug a program. These technologies are described in, for example, Japanese Unexamined Patent Publication (JP-A) No. 2000-10815 (Document 1), JP-A No. 2003-157185 (Document 2), and JP-A No. 2004-005198 (Document 3).

In a computing device system including a plurality of computing devices, there is a case that one typical processing operation (transaction) is completed by sequentially processing and executing processing programs existing across the plurality of computing devices. In an n-tier system, for example, three types of servers (computing devices), a Web server, an application server, and a database server, jointly process and execute a transaction requested by a user.

When the performance of one processing operation (transaction) processed and executed across a plurality of computing devices, as described above, is to be analyzed, many items of event trace data, each indicating the performance status of the program running on a computing device, must be linked together so that the items of trace data constitute one transaction. For example, in order to accurately reconstruct one transaction executed across a plurality of independently operable computing devices when a transaction profile is to be generated based on event trace data, it is necessary to associate the trace data in order of event occurrence time.

Although association of these items of event trace data in order of event occurrence time can be achieved based on the event-occurrence-time data included in each of the event data items, the absolute times of the computing devices needs to be completely synchronized for accurate association. In a practical system, however, there is a problem in that accurate association of event trace data in order of event occurrence time is impossible due to relative time differences in internal clocks of the computing devices.

There is available one method for synchronizing internal clocks across a plurality of independently operable computing devices based on a protocol called the Network Time Protocol (NTP). According to NTP, the computing devices connect to a determined reference clock via a network to adjust the times of their internal clocks.

This NTP, however, is too inaccurate to achieve complete time synchronization. More specifically, it is difficult with NTP to achieve time synchronization, for example, within an error of about 10 ms. Furthermore, NTP is not capable of correcting an extremely large time lag.

In recent computing device systems, a plurality of events can occur within a period of about 10 ms depending on the processing performance of the computing device. In these computing devices, a plurality of programs is very likely to be executed within a period of about 10 ms, and therefore, it is difficult to solve the above-described problem by time synchronization methods based on NTP or equivalents, which can eliminate errors only down to about 10 ms.

Furthermore, in terms of maintenance, it is difficult or not practical to correct the time of the clock in a computing device currently in operation for the purpose of performance measurement or analysis.

In addition to the above-described method for synchronizing clock times, there is available another known method for automatically synchronizing the time of event trace data generated in a plurality of computing devices so that a certain accuracy is ensured.

For example, JP-A No. 62-232055 (Document 4) describes the following method for generating event trace data. According to this method for generating event trace data, a host computer stores the time when tracing is started as the initial time information, and each terminal starts counting with its timer as soon as an event occurs. The time information is synchronized by adding the count value of each terminal to the initial time information of the host computer.

In addition, JP-A No. 2000-348007 (Document 5) describes the following method for achieving commonality of the trace time information. According to this method, commonality of the trace time information is achieved by providing a counter register that measures, on the order of microseconds, a time as a single item of time information used for trace information generated in a plurality of computing devices (processors).

According to the method described in the document 4, each terminal needs to transmit the count value measured with the timer to the host computer.

Furthermore, the host computer needs to have a function for converting the count value received from each terminal into time information.

On the other hand, the method described in the document 5 requires separately a timekeeping section for measuring common time information on the order of microseconds.

As described above, these known methods need separately a section for transmitting and converting time information for time synchronization, and are thus difficult to smoothly adopt for existing computing device systems.

Furthermore, the above-described methods, if adopted, may complicate the structures of computing devices, and are therefore difficult to put into practice.

For these reasons, there is a growing need for technology that can easily and accurately achieve the synchronization of time information across a plurality of computing devices without a special device or structure, though, unfortunately, no effective method has been proposed as of this writing.

SUMMARY OF THE INVENTION

It is therefore an object of the present invention to provide an apparatus and a method for correcting the time of event trace data by eliminating a relative time lag of event trace data generated across a plurality of computing devices.

According to the present invention, an apparatus for correcting a time of an event trace data item generated for each event executed on a plurality of computing devices is provided. The time indicates when the corresponding event occurs. In the apparatus according to the present invention, a data input section receives event trace data items generated for each event executed on each of the plurality of computing devices and outputs the event trace data items in order of occurrence time indicated with the event trace data items. An inter-machine communication-time generating section extracts a transmission event and a reception event transferred between computing devices from among all the event trace data items output by the data input section and generates at least one communication time between the computing devices associated with the corresponding transmission event and the reception event based on a difference between the occurrence time of the transmission event and the occurrence time of the reception event. A time-offset deriving section generates a predetermined time-offset value for each of the computing devices based on the generated communication time. A time correcting section corrects the event occurrence times included in the event trace data items associated with the computing devices based on the respective generated time offset values. A data integrating section receives all of the event trace data items having the corrected occurrence times and outputs the event trace data items in order of corrected occurrence time.

According to the apparatus for correcting the time of event trace data with the above-described structure, the ordinal nature of transmission/reception events occurring in a plurality of computing devices is relied upon to calculate an offset value for time correction based on the difference in occurrence time of the events, and thereby the time lags of the event data can be relatively corrected.

In communication among a plurality of programs, a transmission event always occurs before the corresponding reception event. For example, if program A and program B perform processing across two computing devices through communication and program A and program B are executed in that order, then a transmission event from program A to program B always occurs before a reception event at program B. This order, i.e., the order from a transmission event to the corresponding reception event does not change.

According to the present invention, the difference in occurrence time of a transmission event and a reception event is calculated by arranging the events acquired on computing devices in the predetermined order that programs are executed based on the ordinal nature of the events, and thereby a relative time difference in occurrence time generated between events is calculated as a time offset value.

By adding the calculated time offset value into the occurrence time of event data for the analysis of event trace data, it is possible to eliminate the influence resulting from relative time differences in internal clocks of a plurality of computing devices.

As described above, the occurrence time included in event trace data can be relatively corrected based on the ordinal nature of transmission/reception events to easily and accurately achieve time correction of event trace data without the need for a special apparatus or a complicated structure for synchronizing time information.

According to the present invention, a time lag between a plurality of independently operating servers can be accurately corrected for efficient measurement of, for example, one transaction executed by the servers. The present invention can thus be used for a purpose such as to detect a portion as a performance bottleneck with one measurement.

According to the present invention, a method for correcting a time of an event trace data item generated for each event executed on a plurality of computing devices is provided. The time indicates when the corresponding event occurs. The method comprises the step of receiving event trace data items generated for each event executed on each of the plurality of computing devices and outputting the event trace data items in order of occurrence time indicated with the event trace data items. The method also comprises the step of extracting a transmission event and a reception event transferred between computing devices from among all the event trace data items output in order of occurrence time indicated with the event trace data items and generating a communication time between the computing devices associated with the corresponding transmission event and the reception event based on a difference between the occurrence time of the transmission event and the occurrence time of the reception event. The method further comprises the steps of generating a predetermined time-offset value for each of the computing devices based on the generated communication time, correcting the event occurrence times included in the event trace data items associated with the computing devices based on the respective generated time offset values, and receiving all of the event trace data items having the corrected occurrence times and outputting the event trace data items in order of corrected occurrence time.

As described above, the present invention can be realized as a method for correcting the time of event trace data. In addition, the present invention can be realized in the form of a program for causing a computer to execute the time correction function according to the present invention.

In other words, the present invention can be realized not only with a physical apparatus structure but also with a method or a program by utilizing, for example, a computer apparatus. Thus, the present invention can provide a time-correcting section which is so superior in versatility and expandability that it can be applied to any type of computing device.

BRIEF DESCRIPTION OF THE DRAWINGS

FIG. 2 shows one example of event trace data used in the apparatus for correcting the time of event trace data according to the embodiment of the present invention;

FIG. 3 depicts a machine IP address table used in the apparatus for correcting the time of event trace data according to the embodiment of the present invention;

FIG. 4 depicts a communication status table used in the apparatus for correcting the time of event trace data according to the embodiment of the present invention;

FIG. 5 depicts one example of an inter-machine communication time table generated in the apparatus for correcting the time of event trace data according to the embodiment of the present invention;

FIG. 13 shows one example of an inter-machine communication time table generated by the method for correcting the time of event trace data according to the embodiment of the present invention for a state before time offset processing;

FIG. 14 shows one example of an inter-machine communication time table generated by the method for correcting the time of event trace data according to the embodiment of the present invention for a status in which an offset value is extracted;

FIG. 15 shows one example of an inter-machine communication time table generated by the method for correcting the time of event trace data according to the embodiment of the present invention for a status after time offset processing;

DESCRIPTION OF THE PREFERRED EMBODIMENTS

An apparatus and method for correcting the time of event trace data according to a preferred embodiment of the present invention will now be described with reference to the drawings.

Let us begin with the description of the structure of an apparatus for correcting the time of event trace data with reference to FIGS. 1 to 6.

Figure 1:
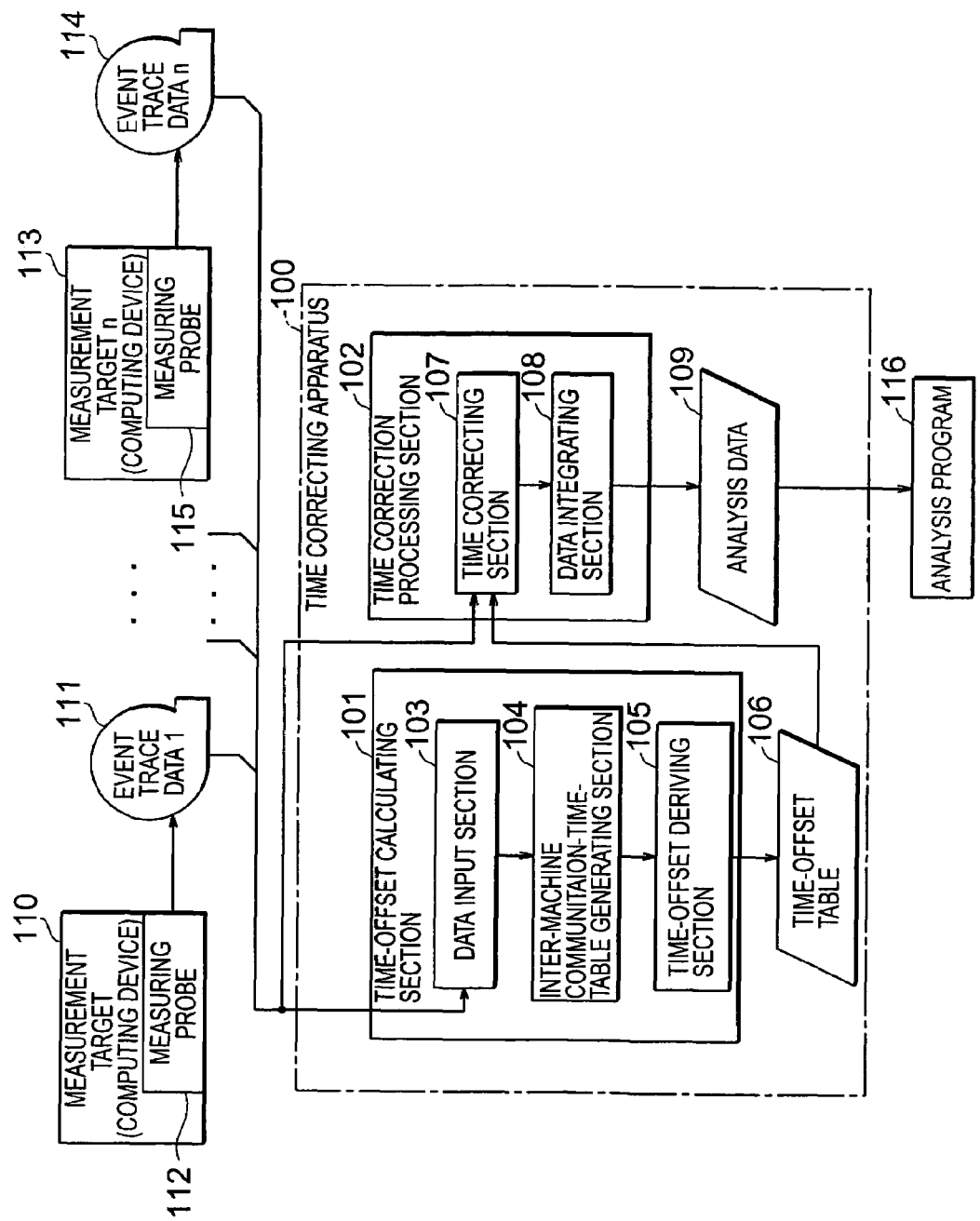
FIG. 1 is a schematic block diagram depicting the structure of an apparatus for correcting the time of event trace data according to an embodiment of the present invention.

FIG. 1 is a schematic diagram depicting the structure of an apparatus for correcting the time of event trace data (hereinafter, referred to as a time correcting apparatus) according to an embodiment of the present invention, where the time correcting apparatus is applied to n measurement targets realized by computing devices.

For the sake of convenience, FIG. 1 shows only a time correcting apparatus 100 and computing devices 110 and 113 from among the n computing devices functioning as the n measurement targets.

The computing devices 110 and 113 constitute, for example, a computing device system functioning as an n-tier system composed of a plurality of servers. The n-tier computing device system includes, for example, three types of servers (computing devices): a Web server, an application server, and a database server for jointly processing and executing a transaction requested by a user. For this reason, it is necessary to correct time lags of event trace data resulting from time differences in internal clocks of the servers.

Thus, the computing device system shown in FIG. 1 is a preferred example to which the time correcting apparatus 100 according to this embodiment is applied.

In FIG. 1, the computing device 110 (113) functioning as a measurement target includes a measuring probe 112 (115), which outputs event trace data 111 (114) as a measurement result.

The measuring probe 112 (115) is an instruction sequence (software) for measurement embedded in the Operating System (OS). It acquires events generated in the computing device 110 (113) and generates the event trace data 111 (114).

The event trace data 111 (114) represents predetermined information generated for each event generated in the computing device 110 (113). The event trace data 111 (114) is generated for each generated event. As illustrated in FIG. 2, the event trace data 111 (114) includes, for example, an own machine number 201 which identifies one of the computing devices associated with the transmission/reception event, an event occurrence time 202, an event type 203, and additional information 204. The additional information 204 includes an own IP address 2041 and an own port number 2402 of the current computing device and a mating IP address 2043 and a mating port number 2044 of the computing device which is the partner for transmission/reception. A plurality of such event trace data items is generated for each event occurring in the computing devices, and is acquired for analysis.

In general, the machine number of a mating machine computing device is not included in the event trace data. To access a mating machine number, therefore, reference is made to a machine IP address table indicating the relationship between a mating machine number 301 and a mating IP address 302, as shown in FIG. 3. This IP address table can be pre-generated by transmitting to an analyzing machine the result output manually or according to a command executed on a measurement target machine.

Referring back to FIG. 1, the time correcting apparatus 100 is included in, for example, an analyzing machine such as a personal computer (PC) other than the computing device 111 (113) functioning as a measurement target. The time correcting apparatus 100 includes a time-offset calculating section 101 and a time correction processing section 102. The time-offset calculating section 101 generates a time-offset table 106 and the time correction processing section 102 outputs analysis data 109.

Each of the above-described components constituting the time correcting apparatus 100 is realized by processing, means, and functions executed according to instructions of a program (software) in a computer. In more detail, a program issues instructions to the components of the computer to cause the components to execute the following predetermined processing and functions; more specifically, data input processing, inter-machine communication-time-table generation processing, time-offset derivation processing, time correction processing, data integration processing, etc. In other words, the program and the computer cooperatively work to realize the processing and means of the time correcting apparatus 100 according to this embodiment.

All or part of the program is stored on a computer-readable recording medium, such as a magnetic disk, an optical disk, or a semiconductor memory, so that the program read from the recording medium is installed in the computer for execution. Furthermore, the program may be loaded into the computer via a communication line (not via a recording medium) for execution.

More specifically, the time-offset calculating section 101 includes a data input section 103, an inter-machine communication-time-table generating section 104, and a time-offset deriving section 105.

The data input section 103 inputs all of the event trace data generated for each event occurring on the computing devices, and outputs the event trace data in order of event occurrence time indicated by the event data.

From among all event trace data output from the data input section 103, the inter-machine communication-time-table generating section 104 extracts transmission events and reception events transmitted/received between computing devices, and generates a communication time between computing devices associated with a transmission/reception event based on the difference in occurrence time of the corresponding transmission event and reception event. The inter-machine communication-time-table generating section 104 generates a communication time table in this manner. The inter-machine communication-time-table generating section 104 constitutes the inter-machine communication-time generating means according to the present invention. More specifically, the inter-machine communication-time-table generating section 104 extracts transmission/reception events from among all event trace data output from the data input section 103 to register and generate a communication status table (entries) including communication events, as shown in FIG. 4. Based on the communication status table, the inter-machine communication-time-table generating section 104 generates a predetermined communication time table, as shown in FIG. 5.

In FIG. 4, the communication status table is represented in each of 1 to n communication paths 401 in one line, and each line for one communication path is represented by an own IP address 402, an own port number 403, a mating IP address 404, a mating port number 405, a data size 406, and a time 407.

As shown in FIG. 5, the communication time table generated by the inter-machine communication-time-table generating section 104 shows computing devices functioning as transmission machine numbers 501 on the leftmost column and computing devices functioning as reception machine numbers 502 on the topmost line. In the communication time table, the difference in the occurrence time of events transmitted/received between each pair of the transmission machine numbers 501 and the reception machine numbers 502 is registered as a communication time between the pair of computing devices.

The time-offset deriving section 105 generates a predetermined time-offset value for each computing device based on the communication time generated in the inter-machine communication-time-table generating section 104 to generate a time-offset table 106.

Figures 6, 7:
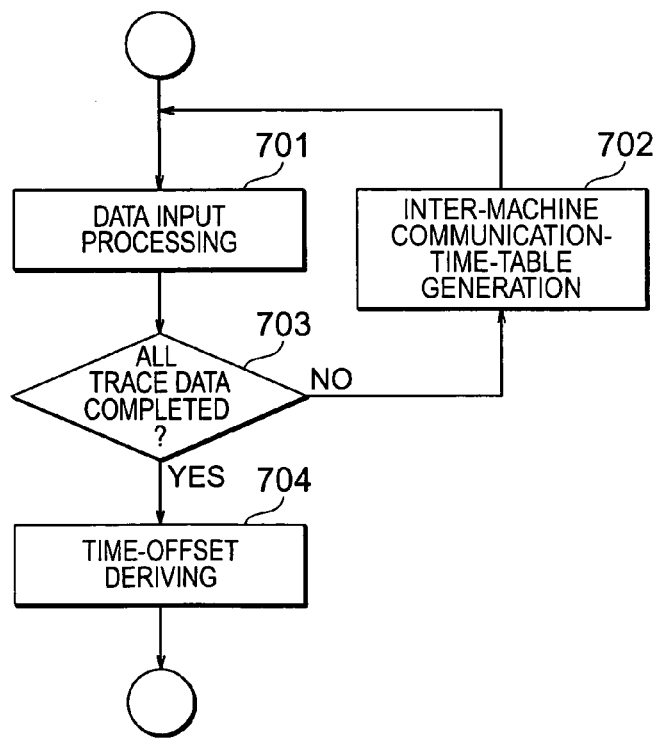
FIG. 6 depicts one example of a time-offset table generated in the apparatus for correcting the time of event trace data according to the embodiment of the present invention.
FIG. 7 is a flowchart illustrating a method for correcting the time of event trace data carried out in the apparatus for correcting the time of event trace data according to the embodiment of the present invention.

The time-offset table 106 generated in the time-offset deriving section 105 is, for example, the table as shown in FIG. 6. In the time-offset table 106, a time-offset value 602 derived for each computing device is shown together with a machine number 601 that identifies the computing device.

The time correction processing section 102 includes a time correcting section 107 and a data integrating section 108.

The time correcting section 107 corrects the occurrence times of events included in all event trace data associated with computing devices based on the time-offset values in the time-offset table generated by the time-offset deriving section 105. The data integrating section 108 inputs all event trace data whose occurrence times have been corrected in the time correcting section 107, and outputs the event trace data in order of corrected occurrence time.

The data integrating section 108 outputs analysis data 109 as event trace data whose occurrence times have been corrected.

The analysis data 109 is data resulting from applying correction to the time 202 in the event trace data shown in FIG. 2 based on the time-offset value 602 in the time-offset table 106. Except for this point, the analysis data 109 includes exactly the same information as the event trace data shown in FIG. 2. This analysis data 109 is analyzed by a predetermined analysis program 116 to, for example, measure the performance of a computing device, generate a transaction profile, or debug a program based on event trace data.

The operation of the time correction apparatus 100 with the above-described structure (method for correcting the time of event trace data, which is referred to as a time correction method) according to this embodiment will now be described with reference to FIGS. 7 to 17.

As shown in FIG. 7, in step 701 predetermined data input processing is performed in the time correcting apparatus 100. In the data input processing, the data input section 103 of the time-offset calculating section 101 inputs all the event trace data 1 to n. Then, the event trace data are selected one event at a time according to the algorithm shown in FIG. 8, and output in order of occurrence time indicated by the event data.

Figure 9:
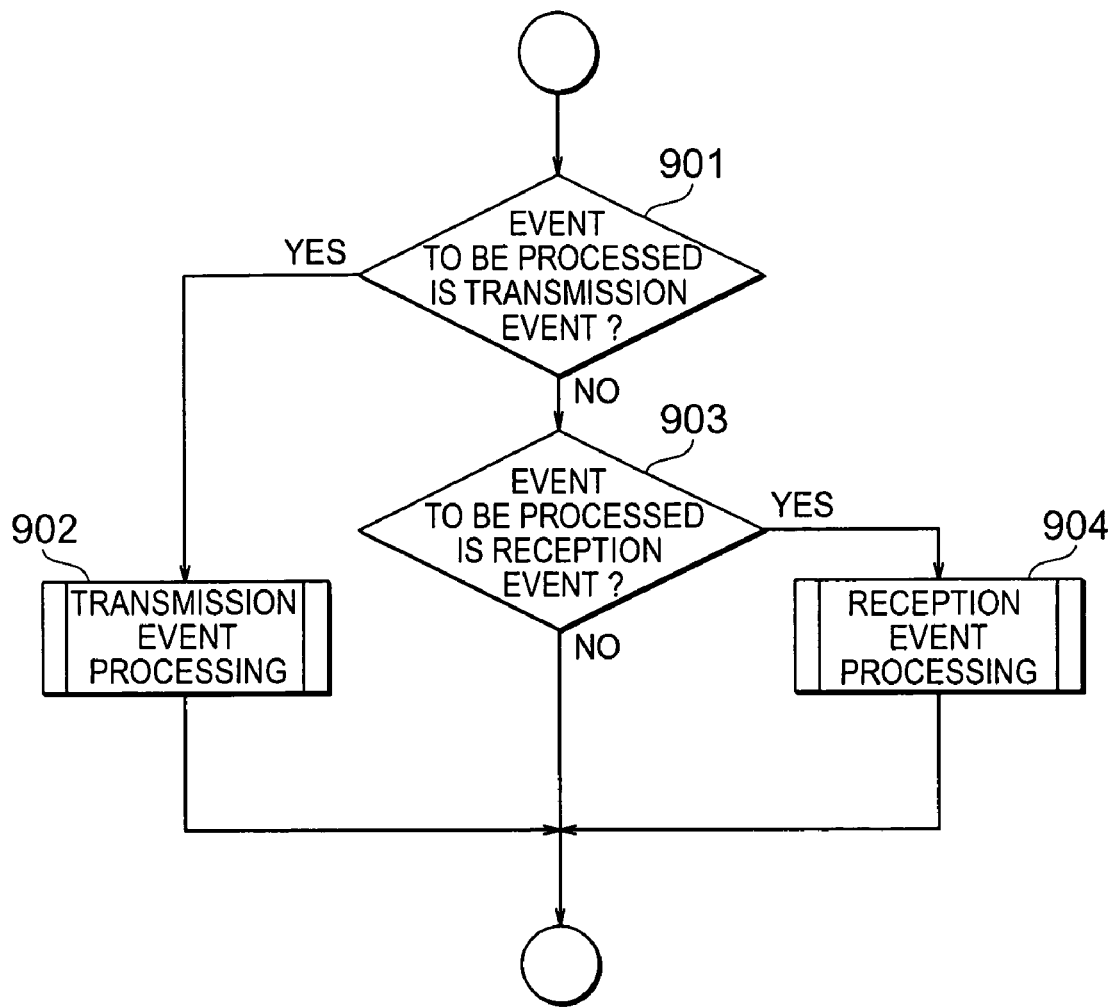
FIG. 9 is a flowchart illustrating extraction processing of a transmission event and a reception event in inter-machine communication-time-table generation processing of the method for correcting the time of event trace data according to the embodiment of the present invention.
Figure 10:
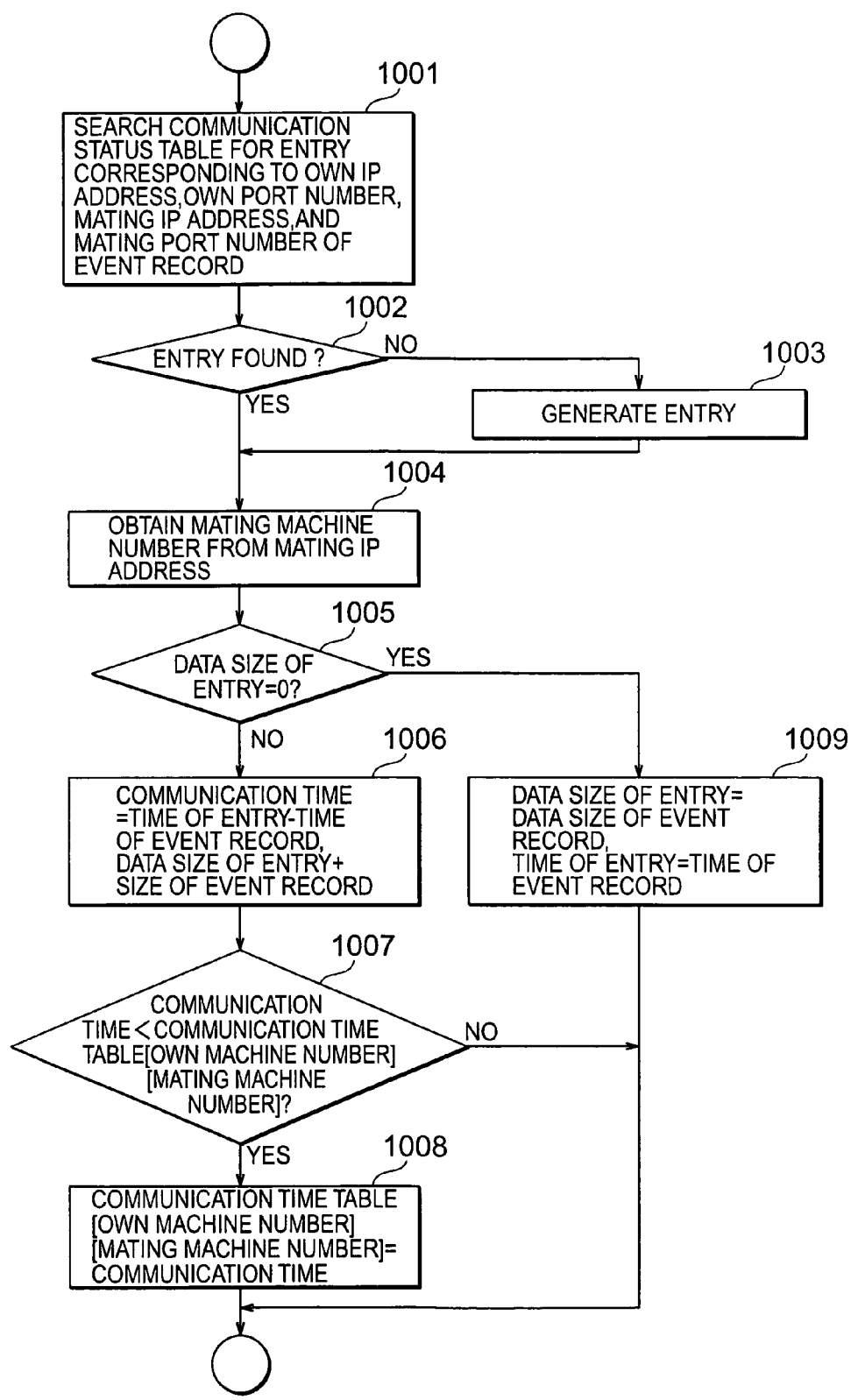
FIG. 10 is a flowchart illustrating details of transmission event processing in the inter-machine communication time table generation processing of the method for correcting the time of event trace data according to the embodiment of the present invention.
Figure 11:
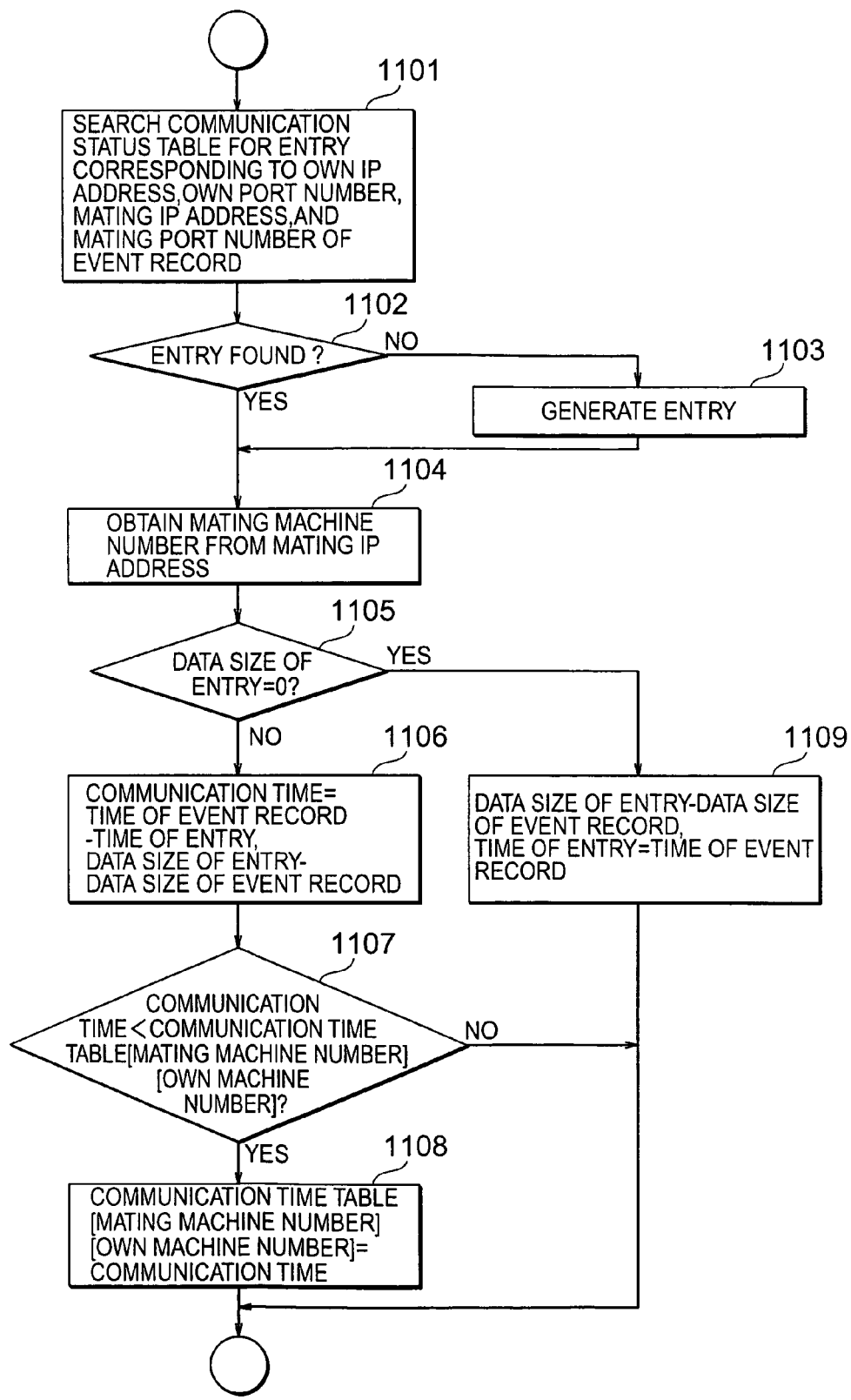
FIG. 11 is a flowchart illustrating details of reception event processing in the inter-machine communication-time-table generation processing of the method for correcting the time of event trace data according to the embodiment of the present invention.

In step 702, the event trace data output in order of occurrence time is input to the inter-machine communication-time-table generating section 104 one event at a time, and predetermined inter-machine communication-time-table generation processing is executed according to the algorithm shown in FIGS. 9 to 11.

The data input processing (step 701) and inter-machine communication-time-table generation processing (step 702) are repeated until all trace data are input, more specifically, until the data input section 103 confirms that the input processing of all trace data to be measured is completed (step 703).

If all trace data have been input, the flow proceeds to step 704. In step 704, predetermined offset derivation processing is executed by the time-offset deriving section 105 according to the algorithm shown in FIG. 12 based on the inter-machine communication time table, and the processing result is output as the time-offset table 106.

Figure 8:
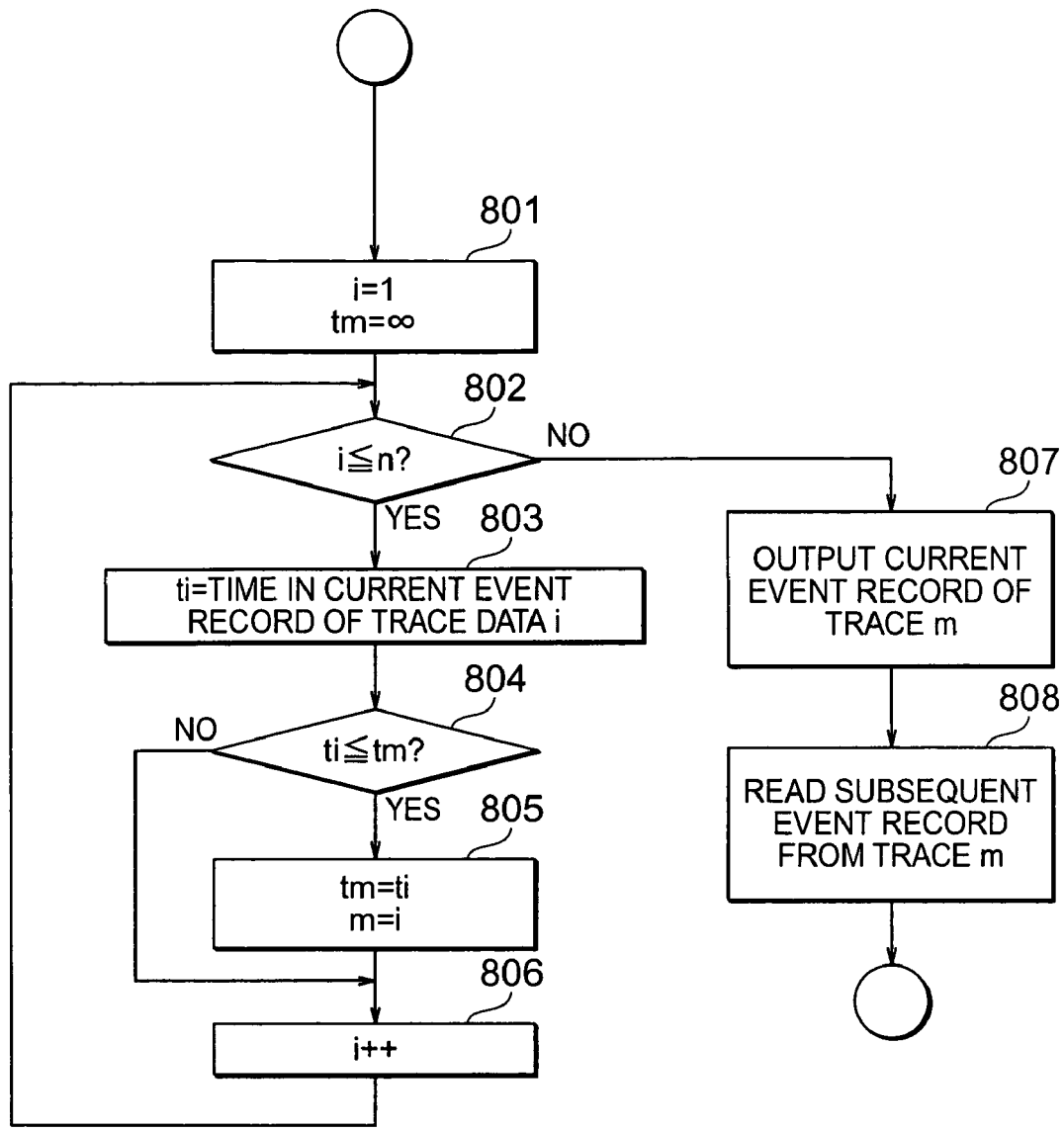
FIG. 8 is a flowchart illustrating details of data input processing in the method for correcting the time of event trace data according to the embodiment of the present invention.

Data input processing (step 701 in FIG. 7) will now be described in detail with reference to FIG. 8.

In data input processing, the machine number of the computing device associated with the event trace data having the minimum occurrence time value, from among all event trace data generated for each event carried out in the computing devices, is selected.

First in step 801, variables i, m, and tm are prepared, representing the current machine number, the machine number associated with the event trace data having the minimum time value of the trace data that have been processed, and the minimum time, respectively. The initial value of variable i is 1, and the initial value of variable m is indefinite. On the other hand, the initial value of time tm is the maximum value of the variable, which is denoted as ∞ in this example.

The machine number i is incremented from 1 to n in the loop starting with step 802. In step 803, the event occurrence time indicated with the trace data of the machine number i (i.e., the time of the current event record: denoted as time ti) is extracted. In step 804, time ti is compared with the current minimum time tm.

If time ti is equal to or smaller than the minimum time tm, ti is substituted for tm and i is substituted for m (step 805), and the flow proceeds to step 806. In contrast, if time ti is larger than minimum time tm, the flow proceeds from step 804 to step 806.

Through this processing, variable m stores the number of the trace data having the minimum time value from among all event trace data. If it is determined in step 802 that the loop processing is completed, the event record indicated by the trace data number m is output as a result of the present data input processing (step 807). Thereafter, in step 808 the subsequent event record is read, and the flow returns to step 801 to repeat the processing in steps 801 to 807. As a result, all event trace data input to the data input section 103 are output in order of occurrence time indicated by the event data.

Inter-machine communication-time-table generation processing (step 702 in FIG. 7) will now be described with reference to FIGS. 9 to 11.

First, extraction of transmission events and reception events in inter-machine communication-time-table generation processing will be described in detail with reference to FIG. 9.

In step 901, it is determined whether the read event to be processed is a transmission event. If the read event to be processed is a transmission event, the flow proceeds to step 902, where transmission event processing is carried out (as illustrated in FIG. 10). If the read event to be processed is not a transmission event, the flow proceeds to step 903. In step 903, it is determined whether the event to be processed is a reception event. If the event is a reception event, the flow proceeds to step 904, where reception event processing is carried out (as illustrated in FIG. 11). If the read event to be processed is neither a transmission event nor a reception event, the event is not to be processed by the time correcting apparatus 100, and therefore the current processing ends.

The processing in FIG. 9 is repeated until transmission events and reception events transmitted/received between computing devices are extracted from among all event trace data output from the data input section 103.

Transmission event processing in inter-machine communication-time-table generation processing (step 902 in FIG. 9) will now be described in detail with reference to FIG. 10.

In step 1001, the communication status table (entries) shown in FIG. 4 is searched for an entry corresponding to the own IP address, own port number, mating IP address, and mating port number of the event record (i.e., corresponding pre-registered reception event). If the search result shows that the corresponding entry (pre-registered reception event) does not exist (NO in step 1002), an entry for the current transmission event is generated in step 1003 and the flow proceeds to step 1004. If the search result shows that an entry (corresponding reception event) exists (YES in step 1002), the flow proceeds directly to step 1004.

In step 1004, reference is made to the machine IP address table (FIG. 3) to obtain the mating machine number 301 from the mating IP address 302 functioning as a receiver of the event.

Next in step 1005, it is determined whether the data size (denoted with reference numeral 406 in FIG. 4) of the corresponding entry is 0 (zero) by referring to the communication status table (FIG. 4). If the data size is not 0, the flow proceeds to step 1006. If the data size is 0, the flow proceeds to step 1009.

If the data size of the corresponding entry is not 0, it means that an entry for the corresponding reception event exists. In this case, in step 1006, the value obtained by subtracting the time (transmission time) indicated by the event record of the transmission event from the time (reception time) indicated by the entry is derived as the communication time. In step 1006, a value obtained by adding the data size (transmission data size) of the event record to the data size (reception data size) of the entry is also derived as the data size of the entry.

As described above, it can be checked whether all data transmitted with the transmission event have been received by the reception event by adding the data size of the transmission event to the entry and by subtracting the data size of the reception event from the entry (as illustrated in FIG. 11). In this manner, the correspondence between transmission events and reception events can be accurately analyzed by taking the data size into consideration.

Next, in step 1007, the communication time obtained in step 1006 is compared with the value of the corresponding inter-machine communication time registered in the communication time table (FIG. 5). The inter-machine communication time is a communication time registered in the communication time table, indicated by a pair composed of the own machine number included in the trace data and the mating machine number obtained in step 1004. The inter-machine communication time is denoted in the format "communication time table [own machine number][mating machine number]". If the comparison result shows that the communication time obtained in step 1006 is smaller than inter-machine communication time registered in the communication time table, the flow proceeds to step 1008. If the comparison result shows that the calculated communication time is equal to or larger than the inter-machine communication time registered in the communication time table, the current processing ends.

In step 1008, the communication time value obtained in step 1006 is substituted for the corresponding communication time table ("communication time table [own machine number][mating machine number]"), and the current processing ends.

On the other hand, if the data size is 0 in step 1005, it means that no entry of the corresponding reception event is registered. In this case, in step 1009, the data size of the event record is registered in the data size of the entry (denoted with reference numeral 406 in FIG. 4), and furthermore, the time of the event record is substituted for the time of the entry (denoted with reference numeral 407 in FIG. 4) to end the current processing.

All the extracted transmission events are registered in entries (communication status table) and a communication time table is generated based on the difference in event occurrence time of the corresponding reception event by repeating the above-described processing.

Reception event processing in inter-machine communication-time-table generation processing (step 904 in FIG. 9) will now be described in detail with reference to FIG. 11.

In step 1101, the communication status table (entries) shown in FIG. 4 is searched for an entry corresponding to the own IP address, own port number, mating IP address, and mating port number of the event record (i.e., corresponding pre-registered transmission event). If the search result shows that the corresponding entry (pre-registered transmission event) does not exist (NO in step 1102), an entry for the current reception event is generated in step 1103 and the flow proceeds to step 1104. If the search result shows that an entry (corresponding transmission event) exists (YES in step 1102), the flow proceeds directly to step 1104.

In step 1104, reference is made to the machine IP address table (FIG. 3) to obtain the mating machine number 301 from the mating IP address 302 functioning as a transmitter of the event.

Next in step 1105, it is determined whether the data size (denoted with reference numeral 406 in FIG. 4) of the corresponding entry is 0 (zero) by referring to the communication status table (FIG. 4). If the data size is not 0, the flow proceeds to step 1106. If the data size is 0, the flow proceeds to step 1109.

If the data size of the corresponding entry is not 0, it means that an entry for the corresponding transmission event exists. In this case, in step 1106, the value obtained by subtracting the time (transmission time) indicated by the entry from the time (reception time) indicated by the event record of the reception event is derived as the communication time. In step 1106, a value obtained by subtracting the data size (reception data size) of the event record from the data size (transmission data size) of the entry is also derived as the data size of the entry.

Next, in step 1107, the communication time obtained in step 1106 is compared with the value of the corresponding inter-machine communication time (communication time: "communication time table [mating machine number][own machine number]) registered in the communication time table (FIG. 5). If the comparison result shows that the communication time obtained in step 1106 is smaller than inter-machine communication time registered in the communication time table, the flow proceeds to step 1108. If the comparison result shows that the calculated communication time is equal to or larger than the inter-machine communication time registered in the communication time table, the current processing ends. In step 1108, the communication time value obtained in step 1106 is substituted for the corresponding communication time table ("communication time table [mating machine number][own machine number]"), and the current processing ends.

On the other hand, if the data size is 0 in step 1105, it means that no entry of the corresponding transmission event is registered. In this case, in step 1109, a value obtained by subtracting the data size of the event record from the data size of the entry (denoted with reference numeral 406 in FIG. 4) is derived as the data size of the entry, and furthermore, the time of the event record is substituted for the time of the entry (denoted with reference numeral 407 in FIG. 4) to end the current processing.

All the extracted reception events are registered in entries (communication status table) and a communication time table is generated based on the difference in event occurrence time of the corresponding transmission event by repeating the above-described processing.

Figure 12:
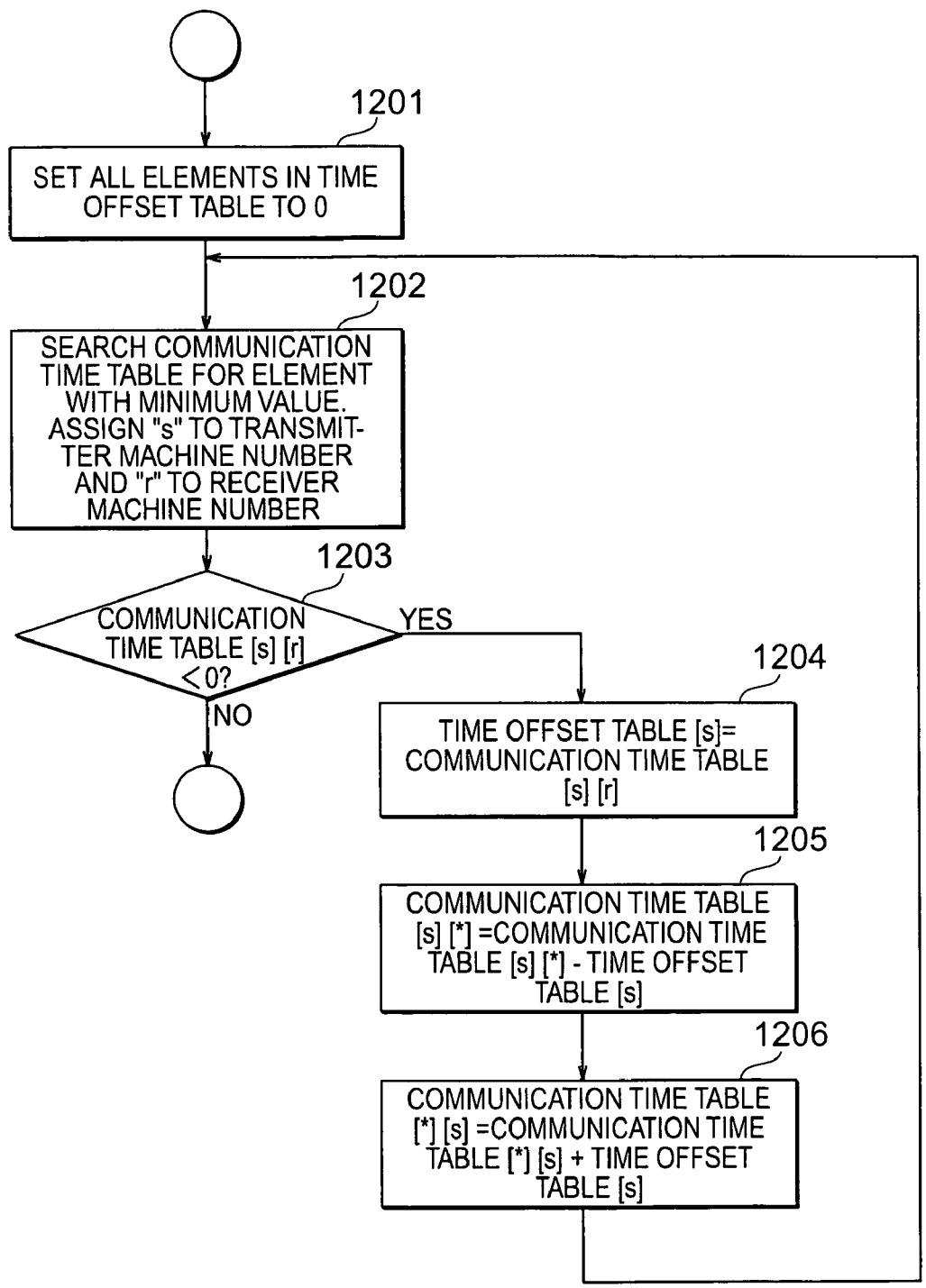
FIG. 12 is a flowchart illustrating details of time-offset derivation processing in the method for correcting the time of event trace data according to the embodiment of the present invention.

Time-offset derivation processing (step 704 in FIG. 7) will now be described in detail with reference to FIG. 12.

First in step 1201, all elements of the time-offset table (FIG. 6) are set to 0, and the flow proceeds to step 1202.

In step 1202, the element having the minimum negative communication time value (maximum absolute value) is extracted from among all communication time values in the communication time table (FIG. 5) generated in the above-described inter-machine communication-time-table generation processing. Then, the transmission machine number (denoted with reference numeral 501 in FIG. 5) and the reception machine number (denoted with reference numeral 502 in FIG. 5) identifying the transmission/reception events associated with the extracted minimum negative value are assigned "s" and "r", respectively, and the flow proceeds to step 1203. If in step 1203 the communication time value indicated with "s" and "r" (communication time table [s][r]) is smaller than 0, the flow proceeds to step 1204. If the value of the communication time table [s][r] is 0 or larger, the current processing ends.

In step 1204, the value of the communication time table [s][r] (minimum negative value) is substituted for the time-offset table [s], and the flow proceeds to step 1205.

In step 1205, the value obtained by subtracting the value of the time-offset table [s] from the value of the communication time table [s][*] (* indicates an integer from 1 to n) is substituted for the value of the communication time table [s][*], and the flow proceeds to step 1206.

In step 1206, the value obtained by adding the value of the time-offset table [s] to the value of the communication time table [*][s] (* indicates an integer from 1 to n) is substituted for the value of communication time table [*][s], and the flow returns to step 1202.

The above-described offset derivation processing (steps 1202 to 1206) is repeated until the communication time table includes no negative communication time values. As a result, time-offset values for all computing devices are derived to complete the time-offset table 106 (as shown in FIG. 6), which is thus output.

Time-offset derivation processing will be described more specifically with reference to an example of the communication time table in FIGS. 13 to 15.

Figures 13, 14, 15:
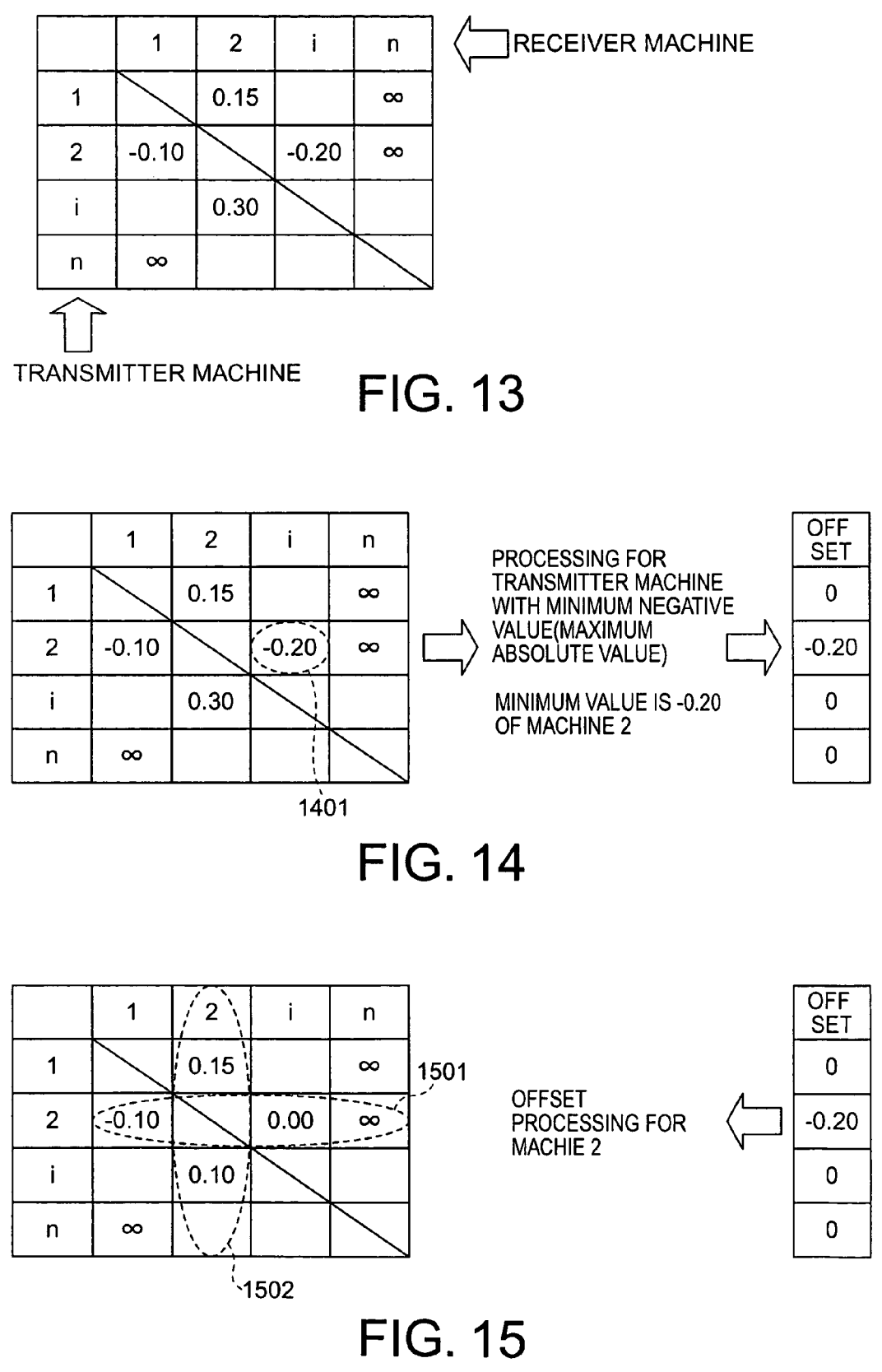

First, if the communication time table shown in FIG. 13 is generated through inter-machine communication-time-table generation processing, the minimum negative value is extracted from among the communication times. In this case, as shown in FIG. 14, the minimum negative value is −0.20, and the transmitter computing device associated with the minimum negative value is machine number 2 (indicated by reference numeral 1401 in FIG. 14). Therefore, −0.20 is registered in the time-offset table as an offset value for machine number 2.

Then, the offset value −0.20 is subtracted from all communication time values in the communication time table associated with the computing device functioning as a transmitter identified with machine number 2, and the offset value −0.20 is added to all communication time values associated with the same computing device functioning as a receiver.

As a result, as shown in FIG. 15, the communication time values [−0.10, −0.20] associated with the computing device functioning as a transmitter identified with machine number 2 are subjected to offset processing to change to [0.10, 0.00] (indicated by reference numeral 1501 in FIG. 15). On the other hand, the communication time values [0.15, 0.30] associated with the computing device functioning as a receiver identified with machine number 2 are subjected to offset processing to change to [−0.05, 0.10] (indicated by reference numeral 1502 in FIG. 15).

Figure 16C:
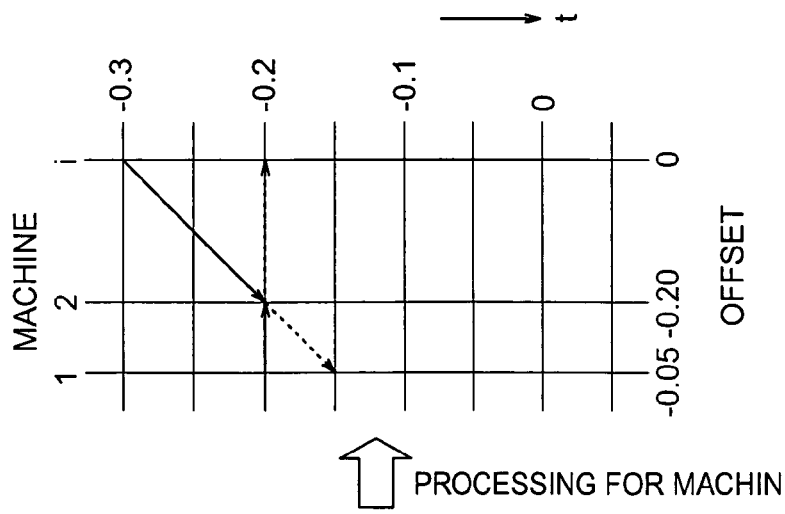
FIGS. 16A, 16B, and 16C are schematic diagrams illustrating the relationship between an offset value and a communication time offset processed by the method for correcting the time of event trace data according to the embodiment of the present invention.
Figure 16B:
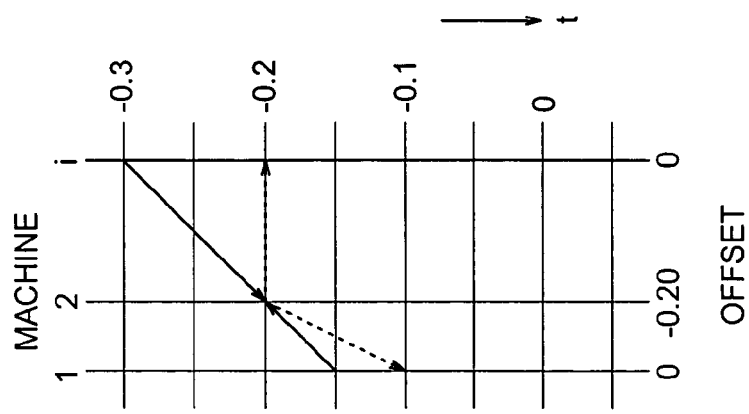
Figure 16A:
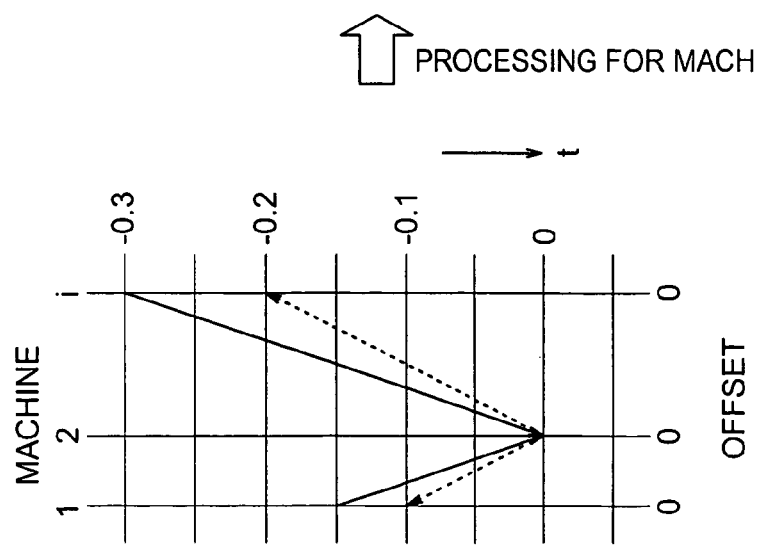

In this manner, offset processing with minimum negative value −0.20 is completed, and then the communication time table is updated as shown in FIG. 15. Thereafter, the subsequent minimum negative value −0.05 (the computing device identified with machine number 1 functioning as a transmitter) is extracted and subjected to the same offset processing. This offset processing is repeated until the communication time table includes no negative communication time values. FIG. 16 schematically shows the relationship between communication times subjected to offset processing as described above and an offset value.

Referring to FIG. 16, dotted-line arrows indicate events associated with machine number 2 functioning as a transmitter, whereas solid-line arrows indicate events associated with machine number 2 functioning as a receiver.

First, for events associated with machine number 2 functioning as a transmitter, the communication time for machine number 1 is −0.10 and the communication time for machine number i is −0.20 in a state before offset processing is applied as shown in (a) of FIG. 16 (corresponding to the table in FIG. 13). Similarly, for events associated with machine number 2 functioning as a receiver, the communication time for machine number 1 is 0.15 and the communication time for machine number i is 0.30 in a state before offset processing is applied as shown in (a) of FIG. 16 (corresponding to the table in FIG. 13).

When machine number 2 functions as a transmitter for machine number 1 and machine number i, applying offset processing to these communication times with the minimum negative value (i.e., the offset value –0.20 of machine number 2) causes the communication time for machine number 1 to be 0.10 and the communication time for machine number i to be 0.00, as shown in (b) of FIG. 16. On the other hand, when machine number 2 functions as a receiver for machine number 1 and machine number i, the communication time for machine number 1 is corrected to –0.05 and the communication time for machine number i is corrected to 0.10 (corresponding to the table in FIG. 15).

Offset processing with the minimum negative value –0.20 is completed in this manner. Subsequently, offset processing based on offset value –0.05, i.e., the minimum negative value associated with machine number 1, is carried out. In this case, the communication time for machine number 1 is 0.05 and the communication time for machine number i is 0.00, as shown in (c) of FIG. 16, if machine number 2 functions as a transmitter for machine number 1 and machine number i. On the other hand, when machine number 2 functions as a receiver for machine number 1 and machine number i, the communication time for machine number 1 is corrected to 0.00 and the communication time for machine number i is corrected to 0.10. Offset processing is repeated in this manner until time correction processing of all inter-machine communication times is completed.

Figure 17:
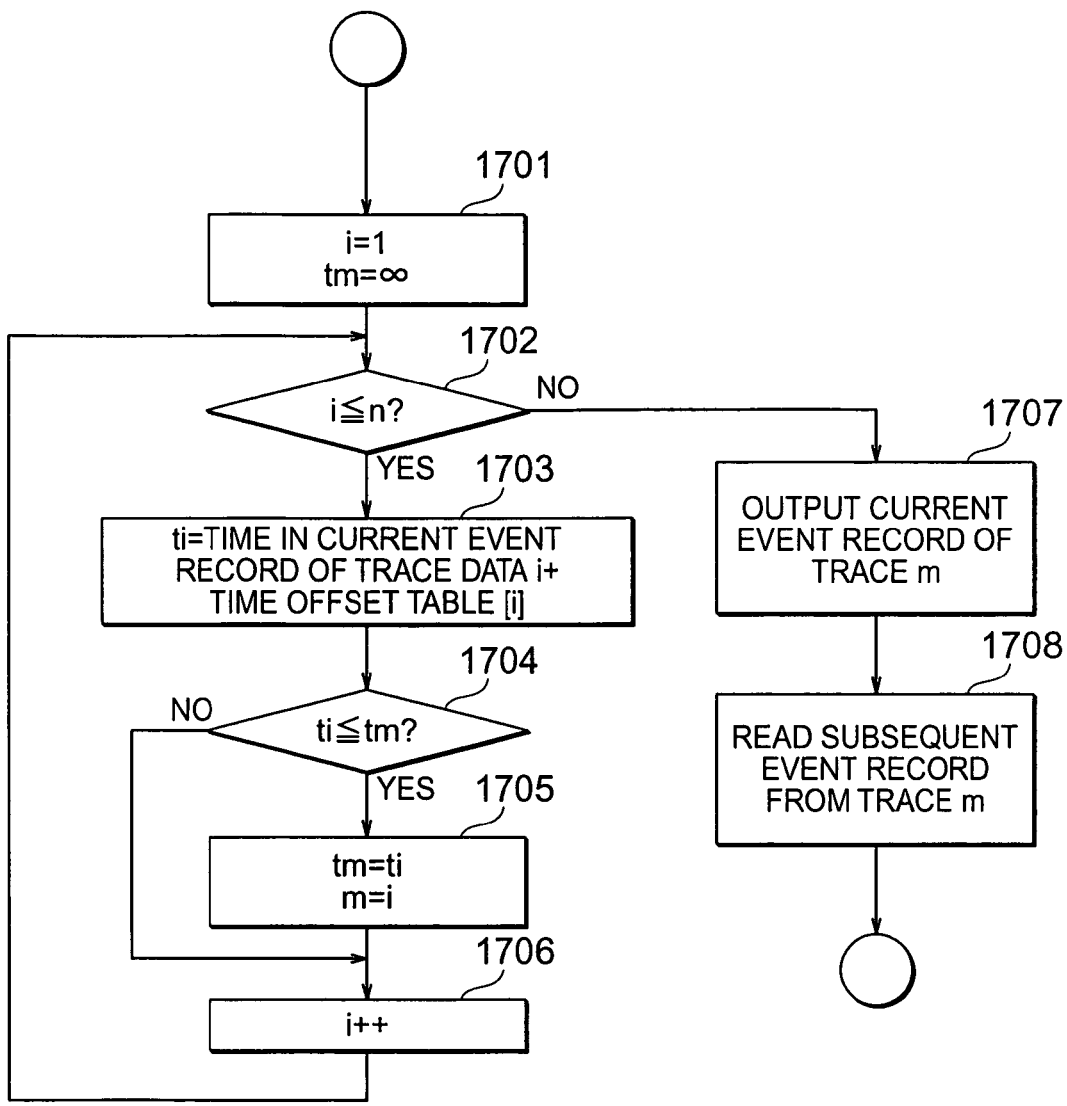
FIG. 17 is a flowchart illustrating details of time correction processing and data integration processing in the method for correcting the time of event trace data according to the embodiment of the present invention.

Data integration processing of time-corrected event trace data will now be described in detail with reference to FIG. 17.

In data integration processing, the machine number of the computing device having the minimum corrected value of occurrence time data is selected from among all event trace data that have been time-corrected through time offset processing.

First, in step 1701, variables i, m, and tm are prepared, representing the current machine number, the machine number associated with the event trace data having the minimum corrected time value of the trace data that have been processed, and the minimum time value, respectively. As described above, the initial value of variable i is 1, and the initial value of variable m is indefinite. On the other hand, the initial value of time tm is the maximum value of the variable, which is denoted as ∞ in this example.

Machine number i is incremented from 1 to n in the loop starting with step 1702. In this loop, the event occurrence time (denoted as ti) obtained by adding the value of the time-offset table [i] (FIG. 6) to the time of the current event record indicated with the trace data of machine number i (step 1703) is compared with the minimum time value tm (step 1704). If time ti is equal to or smaller than the minimum time tm, ti is substituted for tm and i is substituted for m (step 1705), and the flow proceeds to step 1706. In contrast, if time ti is larger than time tm, the flow proceeds from step 1704 to step 1706.

Through this processing, variable m stores the number of the trace data having the minimum corrected time value (i.e., time value corrected with an offset value) from among all event trace data. If it is determined in step 1702 that the loop processing is completed, the event record indicated by the trace data m is output as a result of the present data input processing (step 1707). Thereafter, the subsequent event record is read (step 1708), and the processing in the above-described steps 1701 to 1707 is repeated.

As a result, all event trace data that have been subjected to time offset processing are integrated in order of corrected occurrence time indicated by the event data, and output as the analysis data 109.

The analysis data 109 is input to the analysis program 116, and is then subjected to predetermined analysis processing, such as the measurement of the performance of computing devices, generation of transaction profile, and program debugging based on the event trace data.

As described above, according to the apparatus and method for correcting the time of event trace data of this embodiment, the ordinal nature of transmission/reception events occurring in a plurality of computing devices is relied upon to calculate an offset value for time correction based on the difference in occurrence time of the events, and thereby the time lags of the event data can be relatively corrected. In communication among a plurality of programs, a transmission event always occurs before the corresponding reception event. This order does not change depending on the contents of the programs.

According to this embodiment, the difference in occurrence time of a transmission event and a reception event is calculated by arranging the events acquired on computing devices in the predetermined order that programs are executed based on the ordinal nature of the events, and thereby a relative time difference in occurrence time generated between events is calculated as a time offset. By adding the calculated offset value into the occurrence time of event data for the analysis of event trace data, it is possible to eliminate the influence resulting from relative time differences in internal clocks of a plurality of computing devices.

As described above, the occurrence time included in event trace data can be relatively corrected based on the ordinal nature of transmission/reception events to easily and accurately achieve time correction of event trace data without the need for a special apparatus or a complicated structure for synchronizing time information.

Although the apparatus and method for correcting the time of event trace data according to the present invention have been described by way of example of preferred embodiment, the present invention is not limited to the above-described embodiment. Instead, various modifications are conceivable in the scope of the present invention.

For example, in the above-described embodiment, the plurality of computing devices to which the present invention is applied is realized by a computer system including a plurality of computers connected via a network. The present invention is not limited to computing devices with this structure. The present invention can be applied to, for example, a multi-processor system which is a single computer apparatus including a plurality of processors. The plurality of computing devices to which the present invention is applied may be realized by not only a plurality of computer apparatuses but also a plurality of processors, as long as the plurality of computing devices output events having ordinal nature.

According to the apparatus and method for correcting the time of event trace data of the present invention, the relative time difference between event trace data acquired on computing devices is calculated as a time offset based on the characteristics that a transmission event always occurs before the corresponding reception event in communication between two programs, and thereby event occurrence time recorded in event trace data can be corrected with the time offset.

According to the present invention, the computers do not need to exchange or refer to time information for measurement. Therefore, without functions for synchronizing the timers at the time of measurement, highly accurate time correction can be performed easily and reliably merely by obtaining a predetermined offset value from analysis after the acquisition of trace data. In other words, according to the present invention, a measurement-target computing device (e.g., expensive server) does not need to include a function or a structure for time synchronization, and yet time correction can be performed merely by executing the algorithm according to the present invention with analysis software on a computing device that performs data analysis (e.g., personal computer).

As a result, according to the present invention, time correction of event trace data can be performed easily and accurately without the need for a special apparatus and a complicated structure. For example, one transaction processed by a plurality of independently operable computing devices can be reconstructed where influence of the difference in absolute time between computing devices is eliminated from independently acquired event trace on the computing devices.

The present invention can be applied to time correcting apparatuses for correcting time lags of event trace data having event occurrence times acquired from a plurality of computing devices in the field of a computer system, such as a client/server system and a multi-processor system.

What is claimed is:

1. A physical apparatus for correcting a time of an event trace data item generated for an event executed on a plurality of computing devices, the time indicating when the corresponding event occurs, the apparatus comprising:
   a data input section for receiving event trace data items generated for each event executed on each of the plurality of computing devices and outputting the event trace data items in order of occurrence time indicated with the event trace data items;
   an inter-machine communication-time generating section for extracting a transmission event and a reception event transferred between computing devices from among all the event trace data items output by the data input section and generating at least one communication time between the computing devices associated with the corresponding transmission event and the reception event based on a difference between the occurrence time of the transmission event and the occurrence time of the reception event;
   a time-offset deriving section extracts a communication time of a minimum negative value from the at least one communication time generated by the inter-machine communication-time generating section and registers the minimum negative value as predetermined time-offset value for each of the computing devices;
   a time correcting section for correcting the event occurrence times included in the event trace data items associated with the computing devices based on the respective predetermined time-offset values;
   and a data integrating section for receiving all of the event trace data items having the corrected occurrence times and outputting the event trace data items in order of corrected occurrence time.

2. The apparatus according to claim 1, wherein the inter-machine communication-time generating section:
   extracts the transmission event and the reception event transferred between the computing devices from among all the event trace data items output by the data input section and registers the transmission event and the reception event in order of the occurrence time indicated by the event data,
   if a pre-registered reception event corresponding to the transmission event exists, registers a value obtained by subtracting the occurrence time indicated by the event data of the transmission event from the registration time of the pre-registered reception event as a communication time between the computing devices associated with the transmission event and the reception event,
   if a pre-registered transmission event corresponding to the reception event exists, registers a value obtained by subtracting the registration time of the pre-registered transmission event from the occurrence time indicated by the event data of the reception event as a communication time between the computing devices associated with the transmission event and the reception event, and
   generates a communication time table indicating the communication time between the computing devices associated with the transmission event and the reception event.

3. The apparatus according to claim 2, wherein the time-offset deriving section:
   extracts a communication time of a minimum negative value from among the at least one communication time generated by the inter-machine communication-time generating section and registers the minimum negative value as an offset value,
   executes offset deriving processing in which the offset value is subtracted from a communication time of transmission and reception events related to the computing device associated as a transmitter with the transmission and reception events indicating the minimum negative value if the communication time is related to the computing device functioning as a transmitter or the offset value is added to the communication time if the communication time is related to the computing device functioning as a receiver, and
   repeats the offset deriving processing until the at least one communication time includes no negative value to generate a time offset table indicating a time offset value for a computing device.

4. The apparatus according to claim 3, wherein the plurality of computing devices includes a plurality of computers constituting an n-tier system.

5. The apparatus according to claim 2, wherein the plurality of computing devices includes a plurality of computers constituting an n-tier system.

6. The apparatus according to claim 1, wherein the time-offset deriving section:
   executes offset deriving processing in which the offset value is subtracted from a communication time of transmission and reception events related to the computing device associated as a transmitter with the transmission and reception events indicating the minimum negative value if the communication time is related to the computing device functioning as a transmitter or the offset value is added to the communication time if the communication time is related to the computing device functioning as a receiver, and
   repeats the offset deriving processing until no negative communication time values are present, to generate a time offset table indicating a time offset value for a computing device.

7. The apparatus according to claim 6, wherein the plurality of computing devices includes a plurality of computers constituting an n-tier system.

8. The apparatus according to claim 1, wherein the plurality of computing devices includes a plurality of computers constituting an n-tier system.

9. A method for correcting a time of an event trace data item generated for an event executed on a plurality of computing devices, the time indicating when the corresponding event occurs, the method comprising the steps of:

receiving event trace data items generated for each event executed on each of the plurality of computing devices and outputting the event trace data items in order of occurrence time indicated with the event trace data items;

extracting a transmission event and a reception event transferred between computing devices from among all the event trace data items output in order of occurrence time indicated with the event trace data items and generating at least one communication time between the computing devices associated with the corresponding transmission event and the reception event based on a difference between the occurrence time of the transmission event and the occurrence time of the reception event;

extracting a communication time of a minimum negative value from the at least one communication time and registering the minimum negative value as a predetermined time- offset value for each of the computing devices;

correcting the event occurrence times included in the event trace data items associated with the computing devices based on the respective predetermined time-offset values; and receiving all of the event trace data items having the corrected occurrence times and outputting the event trace data items in order of corrected occurrence time.

10. A program recorded on a computer-readable medium for a computer that functions as a device for correcting a time of an event trace data item generated for an event executed on a plurality of computing devices, the time indicating when the corresponding event occurs, the program generates software code, which, when said code is loaded into memory and run by the computer, causes the computer to perform steps comprising:

receiving event trace data items generated for each event executed on each of the plurality of computing devices and outputting the event trace data items in order of occurrence time indicated with the event trace data items;

extracting a transmission event and a reception event transferred between computing devices from among all the event trace data items output by the data input section and generating at least one communication time between the computing devices associated with the corresponding transmission event and the reception event based on a difference between the occurrence time of the transmission event and the occurrence time of the reception event;

extracting a communication time of a minimum negative value from the at least one communication time and registering the minimum negative value as a predetermined time-offset value for each of the computing devices;

correcting the event occurrence times included in the event trace data items associated with the computing devices based on the respective generated time offset values; and receiving all of the event trace data items having the corrected occurrence times and outputting the event trace data items in order of corrected occurrence time.

11. A method for correcting a time based on data generated for each of a transmission event and a reception event and transferred between a transmitting machine and a receiving machine, comprising:

comparing an occurrence time of the transmission event at the transmitting machine with an occurrence time of the reception event at the receiving machine; and correcting to make earlier the occurrence time of the transmission event at the transmitting machine relative to the occurrence time of the reception event at the receiving machine when the occurrence time of the transmitting event at the transmitting machine is later than the occurrence time of the reception event at the receiving machine.

12. The method according to claim 11, wherein the comparing operation is performed to all transmitting events and reception events, and the comparing operation comprises advancing occurrence times of the transmitting events at the transmitting machine by using a predetermined value within a range between a minimum time correction value and a maximum time correction value, as a time correction value between the transmitting machine and the receiving machine.

13. A physical apparatus for correcting a time based on data generated for each of a transmission event and a reception event and transferred between a transmitting machine and a receiving machine, the apparatus comprises:

a comparing unit that compares an occurrence time of the transmission event at the transmitting machine with an occurrence time of the reception event at the receiving machine; and a correction unit that makes earlier the occurrence time of the transmission event at the transmitting machine relative to the occurrence time of the reception event at the receiving machine when the occurrence time of the transmitting event at the transmitting machine is later than the occurrence time of the reception event at the receiving machine.

14. The apparatus according to claim 13, wherein the comparing unit performs the comparing operation to all transmitting events and reception events, and advances occurrence times of the transmitting events at the transmitting machine by using a predetermined value within a range between a minimum time correction value and a maximum time correction value, as a time correction value between the transmitting machine and the receiving machine.

* * * * *

UNITED STATES PATENT AND TRADEMARK OFFICE
CERTIFICATE OF CORRECTION

| | | |
|---|---|---|
| PATENT NO. | : 7,594,146 B2 | Page 1 of 1 |
| APPLICATION NO. | : 11/062930 | |
| DATED | : September 22, 2009 | |
| INVENTOR(S) | : Horikawa et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

Signed and Sealed this

Twenty-eighth Day of September, 2010

David J. Kappos
*Director of the United States Patent and Trademark Office*